United States Patent
Eisenhower, Jr. et al.

(10) Patent No.: US 7,070,086 B2
(45) Date of Patent: Jul. 4, 2006

(54) SENSOR PRE-LOAD AND WELD FIXTURE APPARATUS AND METHOD

(75) Inventors: Gary W. Eisenhower, Jr., Freeport, IL (US); Wayne L. Ehlers, Lanark, IL (US); Brian J. Marsh, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 209 days.

(21) Appl. No.: 10/792,247

(22) Filed: Mar. 3, 2004

(65) Prior Publication Data

US 2005/0194362 A1 Sep. 8, 2005

(51) Int. Cl.
*B23K 31/02* (2006.01)
*B23K 26/00* (2006.01)

(52) U.S. Cl. ............... 228/212; 228/44.3; 219/121.63; 219/121.64

(58) Field of Classification Search ............... 228/49.1, 228/49.2, 49.4, 103, 49.5, 44.3, 212; 219/121.63, 219/121.64, 158, 121.6; 269/283, 284, 86, 269/100, 238
See application file for complete search history.

(56) References Cited

U.S. PATENT DOCUMENTS

| | | | | |
|---|---|---|---|---|
| 4,216,401 A | * | 8/1980 | Wagner | 310/313 R |
| 4,454,440 A | | 6/1984 | Cullen | 310/313 R |
| 4,804,130 A | * | 2/1989 | Kwan et al. | 228/6.2 |
| 4,978,941 A | | 12/1990 | Brown | 340/447 |
| 5,181,646 A | * | 1/1993 | Ushiki et al. | 228/4.5 |
| 5,244,195 A | * | 9/1993 | Lawrence et al. | 269/227 |
| 5,295,700 A | * | 3/1994 | Crews et al. | 279/5 |
| 5,362,036 A | * | 11/1994 | Whiteman | 269/51 |
| 5,598,775 A | * | 2/1997 | Vongfuangfoo et al. | 100/233 |
| 5,821,425 A | | 10/1998 | Mariani et al. | 73/703 |
| 6,079,276 A | | 6/2000 | Frick et al. | 73/718 |
| 6,189,210 B1 | * | 2/2001 | Cox et al. | 29/861 |
| 6,218,936 B1 | | 4/2001 | Imao | 340/447 |

(Continued)

FOREIGN PATENT DOCUMENTS

JP 2000210783 2/2000

OTHER PUBLICATIONS

PCT-Notification of Transmittal of the International Search Report and the Written Opinion of the International Searching Authority, or the Declaration, Date of Mailing, Jun. 16, 2005.

*Primary Examiner*—Kevin Kerns
*Assistant Examiner*—Michael Aboagye
(74) *Attorney, Agent, or Firm*—Kermit D. Lopez; Luis M. Ortiz

(57) ABSTRACT

A sensor pre-load and welding apparatus and method are disclosed. A weld fixture apparatus includes a fixture base upon which a sensor package having a sensor base and a sensor cover is located, and a load bar associated with a spring, wherein the load bar provides a specific weight to the fixture base in order to assist in maintaining the sensor cover and the sensor base parallel to one another upon the fixture base. An adjustable load foot is generally located above the fixture base, such that the adjustable load foot applies a pre-determined load with a specific weight to the sensor base in order to maintain the sensor cover and the sensor base securely in place as the sensor base and the sensor cover are welded to one another in order to configure the sensor package.

16 Claims, 4 Drawing Sheets

U.S. PATENT DOCUMENTS

| | | | |
|---|---|---|---|
| 6,222,151 B1 * | 4/2001 | Ziolkowski et al. | 219/86.1 |
| 6,241,141 B1 | 6/2001 | Al-Nabulsi | |
| 6,259,360 B1 | 7/2001 | Takamura | 340/445 |
| 6,450,021 B1 | 9/2002 | Katou et al. | 73/146.5 |
| 6,484,585 B1 | 11/2002 | Sittler et al. | 73/718 |
| 6,571,638 B1 | 6/2003 | Hines et al. | 73/702 |
| 6,793,011 B1 * | 9/2004 | Armstrong et al. | 165/133 |
| 2005/0145330 A1 * | 7/2005 | Shubinsky et al. | 156/272.8 |

* cited by examiner

SENSOR PRE-LOAD AND WELD FIXTURE APPARATUS AND METHOD

TECHNICAL FIELD

Embodiments are generally related to sensing methods and systems. Embodiments are also related to pressure and temperature sensors. Embodiments are additionally related to surface acoustic wave (SAW) devices and sensors. Embodiments are additionally related to welding fixture devices and welding techniques thereof.

BACKGROUND OF THE INVENTION

Various sensors are known in the pressure and temperature sensing arts. The ability to detect pressure and/or temperature is an advantage to any devices which are under constant temperature and which can be severely affected by temperature conditions. An example of such a device is an automobile tire, which of course, experiences variations in both temperature and pressure. Many different techniques have been proposed for sensing the pressure and/or temperature in tires, and for delivering this information to the operator at a central location on the vehicle so that he knows that a tire is at low or high air pressure.

Such sensors generally communicate with the vehicle so that the sensed pressure and/or temperature are displayed to the operator when the vehicle is moving, i.e. the wheel rotating relative to the body of the vehicle. Such devices are generally relatively complex and expensive or alternatively are not particularly robust.

Some tire pressure and/or temperature sensor systems incorporate a sensor that is fixed to the body so no rotating electrical contact between the rotating wheel and the chassis is required. In this system, a sensor rod is deflected by contact with the tire sidewall when the sidewall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of fixed sensor the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some pressure sensor systems utilize a rotating encoder formed by a multi-polar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multi-polar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce.

One type of sensor that has found wide use in pressure and temperature sensing applications, such as, vehicle tires, is the Surface Acoustic Wave (SAW) sensors, which can be composed of a sense element on a base and pressure transducer sensor diaphragm that is part of the cover. For a SAW sensor to function properly, the sensor diaphragm should generally be located in intimate contact with the sense element at all pressure levels and temperatures.

To compensate for expansion in the packaging, the sense element and sensor diaphragm must be preloaded when they are assembled to shift the output frequency a known amount, which ensures contact at all times. In conventional sensor designs, an interference fit between the cover and base can maintain a preload until the cover and base are locked in place by welding, soldering or other connecting means.

In order to properly configure a sensor, such as a SAW sensor, the sensing device should include a sensor cover and a sensor base which are welded in order form a hermitic seal thereof. One of the problems with conventional welding devices and fixtures utilizing in forming sensor devices is that the sensing element is often at the mercy of the fixture load, which can subject the sensor elements within the sensor package to damage and/or prevent a true hermetically seal package from being formed. A need thus exists for an improved weld fixture apparatus and welding method, which can be utilized with the weld fixture apparatus, in order to properly configure sensor packages.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor assembly method and system.

It is another aspect of the present invention to provide an improved method and system for welding components to a sensor during assembly thereof.

It is yet another aspect of the present invention to provide a welding fixture technique for use in assembling sensor packages, such as, for example, SAW sensor devices.

The aforementioned aspects of the invention and other objectives and advantages can now be achieved as described herein. A sensor pre-load and welding system and method are disclosed, which includes a weld fixture that includes a fixture base upon which a sensor package having a sensor base and a sensor cover is located, and a load bar associated with a spring, wherein the load bar provides a specific weight to the fixture base in order to assist in maintaining the sensor cover and the sensor base parallel to one another upon the fixture base. An adjustable load foot is generally located above the fixture base, such that the adjustable load foot applies a pre-determined load with a specific weight to the sensor base in order to maintain the sensor cover and the sensor base securely in place as the sensor base and the sensor cover are welded to one another in order to configure the sensor package.

A plurality of guideposts can also be integrated with the load bar in order to assist in maintaining the sensor cover and the sensor base parallel to one another upon fixture base. The sensor itself can be, for example, a SAW sensor that includes one or more quartz components. Additionally, a welding mechanism can be provided for tack welding the sensor cover to the sensor base in order to seal the sensor package. Tack welding can be generated via a low laser power. When tack welding is implemented, the sensor cover and the sensor base are preferably located perpendicular to a laser beam generated by the welding mechanism. Stitch welding can also be implemented in order to weld the sensor cover to the sensor base via a plurality of stitch welds for sealing the sensor package. Finally, a high power laser can be implemented final welding of the sensor base to the sensor cover upon the weld fixture.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
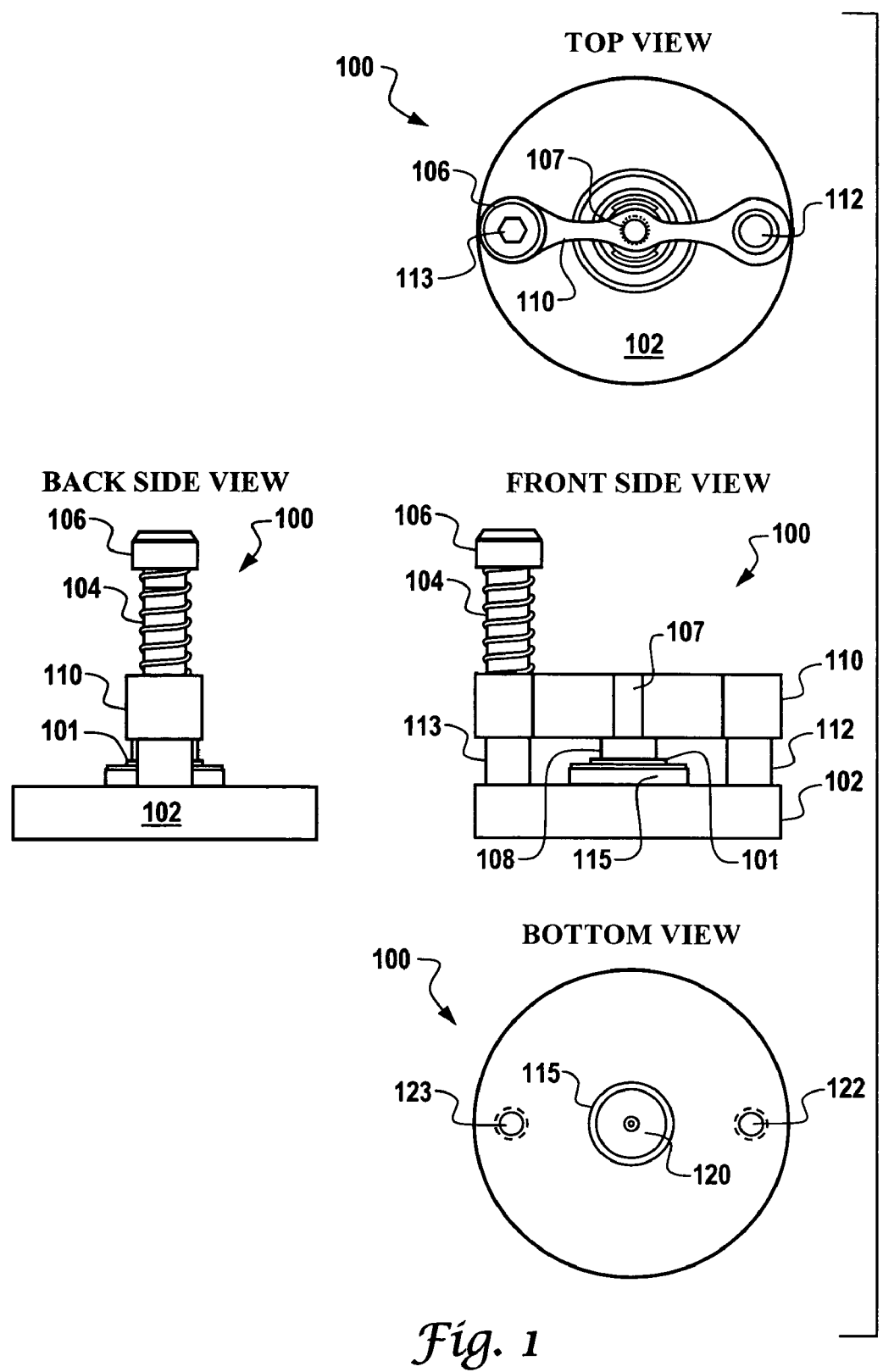
FIG. 1 illustrates various views of a weld fix fixture apparatus, which can be implemented in accordance with a preferred embodiment of the present invention.
Figure 2:
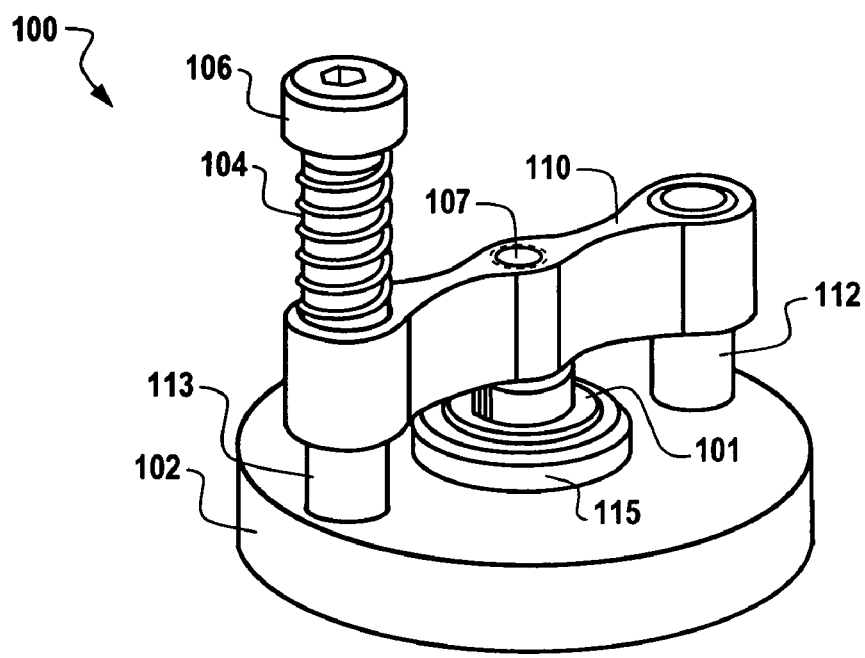
FIG. 2 illustrates a side perspective view of the weld fixture apparatus depicted in FIG. 1, in accordance with a preferred embodiment of the present invention.
Figure 3:
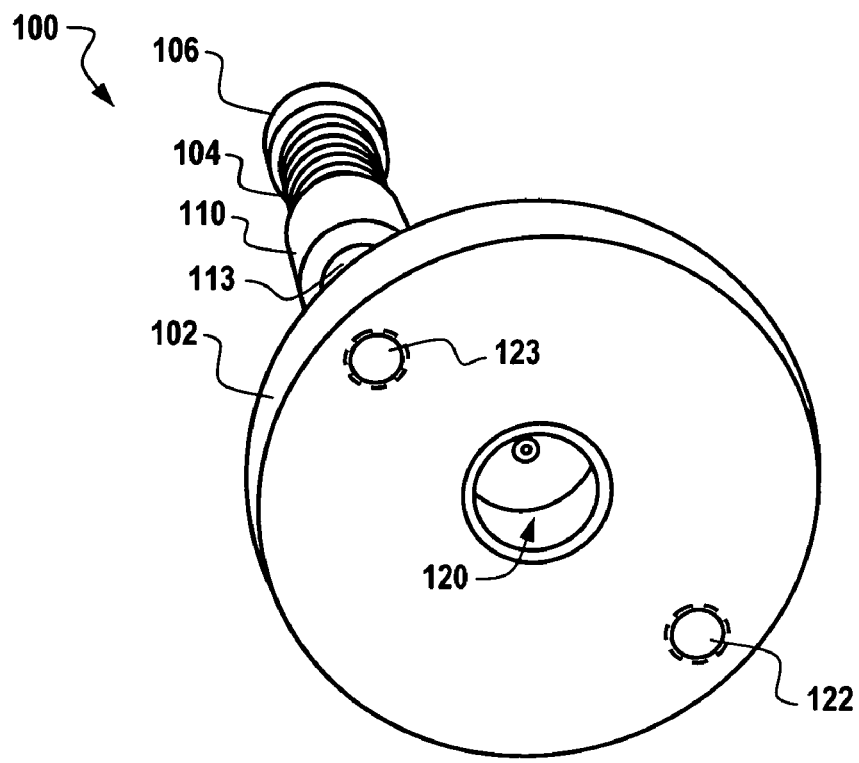
FIG. 3 illustrates a bottom perspective view of the weld fixture apparatus depicted in FIGS. 1 and 2, in accordance with a preferred embodiment of the present invention.

FIG. 1 illustrates various views of a weld fix fixture apparatus 100, which can be implemented in accordance with a preferred embodiment of the present invention. Top and bottom views of weld fixture apparatus 100 are disclosed in FIG. 1, along with back side and front side views. FIG. 2 illustrates a side perspective view of the weld fixture apparatus 100 depicted in FIG. 1, in accordance with a preferred embodiment of the present invention. Additionally, FIG. 3 illustrates a bottom perspective view of the weld fixture apparatus 100 depicted in FIGS. 1 and 2, in accordance with a preferred embodiment of the present invention. In FIGS. 1–3, similar or identical parts are generally indicated by identical reference numerals.

Weld fixture apparatus 100 generally includes a fixture base 102 upon which a sensor package 101 having a sensor base (not shown in FIG. 1) and a sensor cover (also not shown in FIG. 1) can be positioned and located for welding via weld fixture apparatus 100. Fixture base 102 can be farmed from a material such as copper. In general, fixture base 102 functions a locator, and includes a locator hold 120 for last placement via a welding mechanism (e.g., a laser welding mechanism), which is described in greater detail here. A load bar 110 is generally associated with a spring 104, such that load bar 110 provides a specific weight to fixture base 102 in order to assist in maintaining the sensor cover and the sensor base of sensor package 101 parallel to one another upon fixture base 102. As indicated in FIG. 1, the load bar 110 receives the spring 104. It Is also clear from the configuration of weld fixture apparatus 100 depicted In FIG. 1 that the load bar 110 is located perpendicular to the spring 104.

Sensor package 101 is preferably located below a central portion 107 of load bar 110. Spring 104 Is capped by a shouldered cap screw 106. Additionally, an adjustable load foot 108 can be located above the fixture base 102, such that the adjustable load foot 108 applies a pre-determined load with a specific weight to the sensor base in order to maintain the sensor cover and the sensor base securely in place as the sensor base and the sensor cover are welded to one another in order to configure sensor package 101.

A plurality of guideposts 112 and 113, which function as locator pins can be associated or integrated with the load bar 110 in order to assist in maintaining the sensor cover and the sensor base of sensor package 101 parallel to one another upon fixture base 102. Note that sensor package 101 can be configured as a SAW sensor device (e.g., a SAW "button" sensor), which includes one or more quartz components. An example of such a SAW sensor device is described in greater detail herein with respect to FIG. 4, including sensor base and sensor cover components thereof. Fixture base 102 additionally includes holes 123 and 122 which can be utilized to respectively engage guideposts 112 and 113 at fixture base 102.

Figure 4:
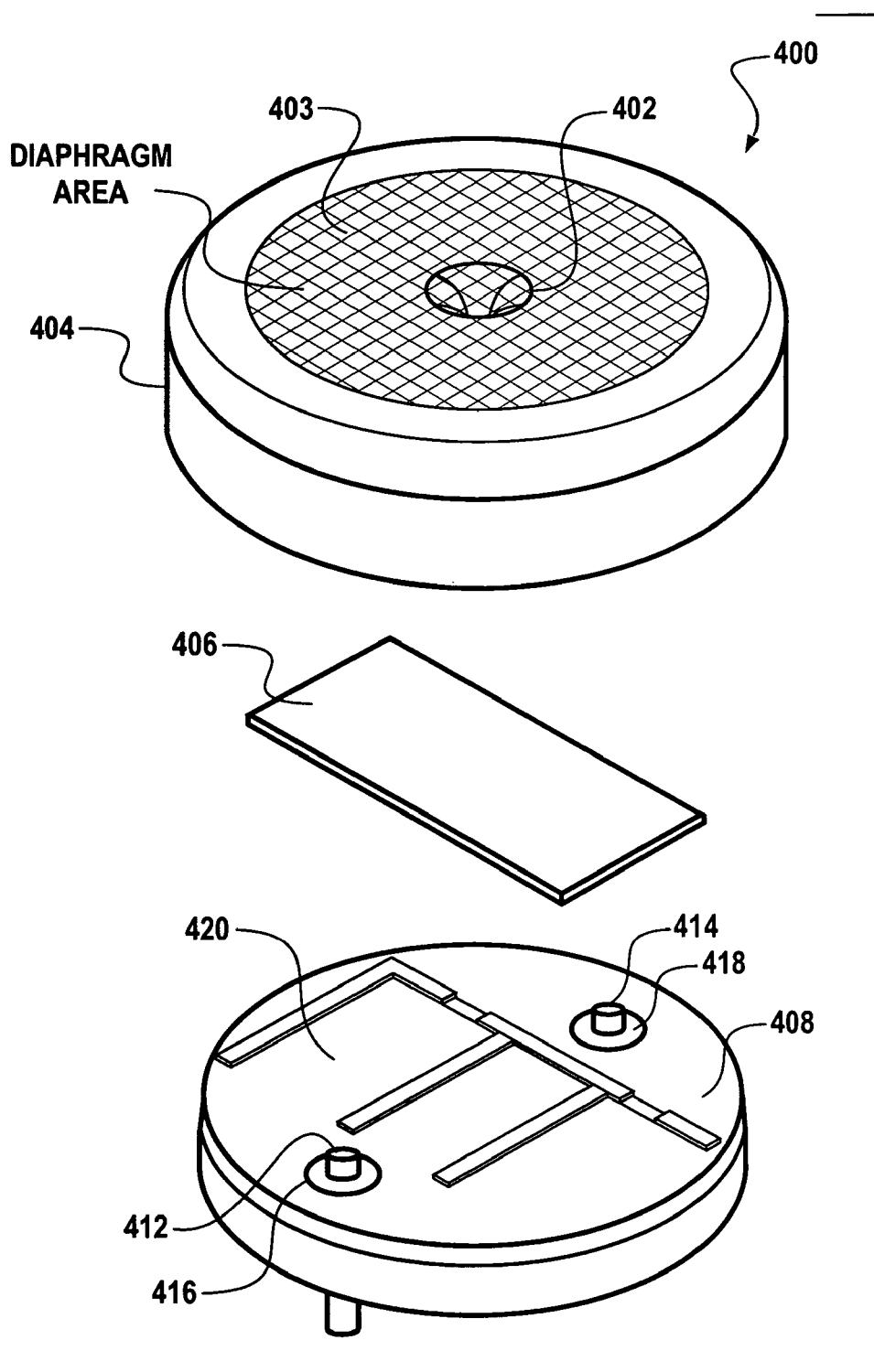
FIG. 4 illustrates an exploded view of a sensor package, which can be implemented in accordance with a preferred embodiment of the present invention.

In general, sensor package 101, such as, for example, a SAW sensor assembly, requires a weld process that will not affect the pre-determined load on any of the SAW quartz components inside sensor package 101 when the sensor cover is welded to the base of sensor package 101 (i.e., see FIG. 4 for sensor cover and sensor base). Thus, weld fixture apparatus 100 can be utilized to hold the sensor cover and sensor base in parallel with each other at a specific load. Additionally, as will be explained in greater detail herein, a welding method can be implemented which includes spot weld, stitch welds, and a final weld at various power and welding size setting so as not to apply additional loads or resulting in un-loading of the quartz components within the sensor package 101.

FIG. 4 illustrates an exploded view of a sensor package 400, which can be implemented in accordance with a preferred embodiment of the present invention. Sensor package 400 of FIG. 4 is generally analogous to sensor package 101 of FIG. 1. Sensor package 400 can be utilized, for example, as a pressure sensor that includes a sense element 406, a sensor base 408, and a cover 404 that contains a flexible diaphragm 403 and a dimple 402.

For the sensor to achieve the application accuracy required, the dimple 402 should be in intimate contact with the sense element 406 at all pressure levels and temperatures. To compensate for thermal expansion of the packaging materials (i.e., base 408 and cover 404), the sense element 406 (e.g., a quartz sense element) and the sensor diaphragm 403 can be preloaded when assembled, in order to shift the output frequency a known amount to ensure contact at all times.

Note that although the sensor package 400 can be implemented as a SAW pressure sensor, it can be appreciated that alternative embodiments of the present invention can be implemented in the context of a non-SAW sensors. For example, rather than utilizing a quartz sense element, other types of sense elements (e.g., ceramic, silicon and the like) may be utilized in accordance with alternative embodiments of the present invention.

The dimple 402 can be formed in the center of the pressure sensor diaphragm 403 portion of the cover 404 during its manufacture. The dimple 402 generally contacts a flat surface on the sense element 406. In general, the sensor package 400 can be embodied as a small, circular component. The design configuration is generally implemented as small, circular, hermetically sealed button package. Example dimensions include approximately 12 mm in diameter and approximately 2 mm thick. It can be of course be appreciated that such dimensions are mentioned for illustrative purposes only, and are not considered limiting features of the present invention. The dimensions of sensor package 400 can vary, depending on the needs and use of such a device.

The design of the cover 404 and base 408 are such that it generally allows for the reduction of assembly tolerances. The sensor material of the base 408 and cover 404 can be formed from stainless steel 17-7 PH. The advantages of such a material are discussed in greater detail herein. The pressure sensor can also be configured in association with an interface design board. For example, a PCB or flex circuit interconnect can be located between the pressure sensor button package and one or more antennas thereof for the transmission and receipt of wireless data.

Sensor package 400 generally includes a package cover 404 that includes a dimple 402 formed at the center of diaphragm 403. In FIG. 4, the diaphragm area of diaphragm 403 is indicated generally by a circular dashed line. Similarly, dimple 402 is generally indicated also by a circular dashed line. The diaphragm 403 is the flat surface on the top of cover 402.

Sense element 106 can be implemented, for example, as a quartz sense element, a ceramic sense element, a silicon sense element and the like. A SAW chip, for example, can be utilized as sense element 406. Base 408 includes a base portion 220, which can be recessed into base 408 and in which the sensor element or sense element 406 can rest.

Cover 404 can be initially formed from a flat sheet stock that is approximately 0.50 mm thick in the annealed condition. The cover can next be stamped into a circular shape, and deep drawn into a cup configuration. Next, dimple 402 can be formed into the center of the diaphragm 403 portion of cover 404, such that dimple 402 is formed approximately 0.6 mm deep into cover 404. It can be of course be appreciated that such dimensions are discussed herein for illustrative purposes only, and are not considered limiting features of the present invention. Again, the dimensions of cover 404 may vary, depending on the needs and use of such a device.

Base 408 can also be formed from a stainless steel such as a stainless steel 17-7 PH material. Stamping approximately 2 mm thick annealed material into a circular disk can form base 408. Such a disk can be formed so that two small saddles are protruding from base 408 for which the sensor chip (e.g., a sense element 406) will rest. Holes 416 and 418 can thus be punched into base 408 to facilitate glass to metal seals thereof. Hole 416 is associated with pin 412, while hole 418 is associated with pin 414. Pins 412 and 414 can be utilized to make electrical connection through the hermetic seal.

Figure 5:
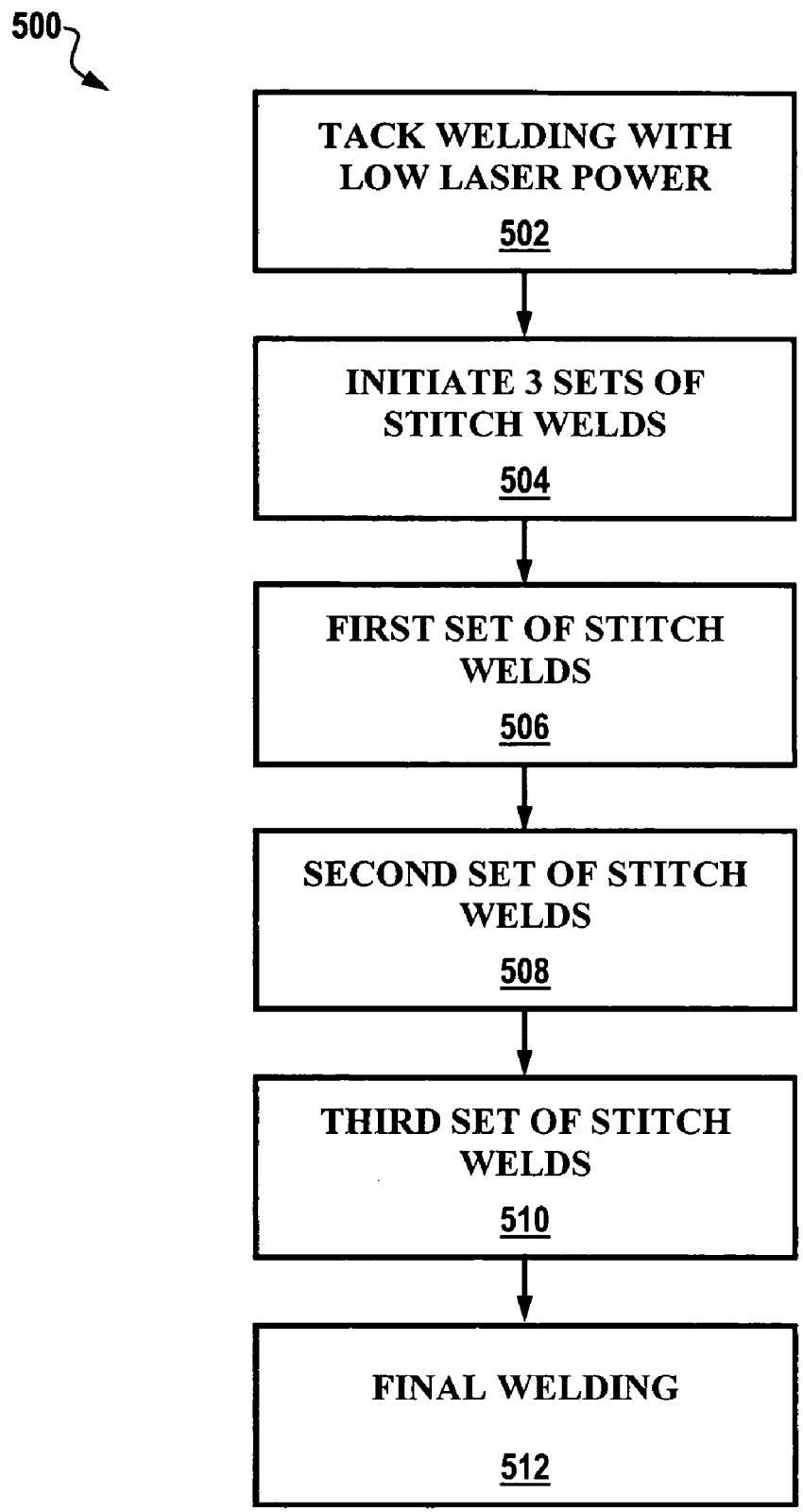
FIG. 5 illustrates a high-level flow chart depicting a welding method, which can be implemented in accordance with a preferred embodiment of the present invention.

FIG. 5 illustrates a high-level flow chart 500 depicting a welding method, which can be implemented in accordance with a preferred embodiment of the present invention. The weld process can be composed generally of 3 individual steps. All reference to location on the circular part is made using a clock face naming convention. The first step is a tack weld, which is generally indicated by block 502 of flow chart 500. The operation depicted at block 502 can be accomplished utilizing a low laser power welding mechanism, such that the part to be welded is located perpendicular to the laser beam generated by the welding mechanism. The part is welded with one tack weld at 4 points located at 12, 6, 3, and 9 o'clock respectively.

The second process step involves stitch welding, which is generally initiated as indicated at block 504. The stitch welding process is composed of 3 sets of stitch welds, which are respectively depicted at blocks 506, 508 and 510. The part to be welded is generally located at about a 65-degree angle from the laser beam generated by the welding mechanism. The first set of stitch weld, as illustrated at block 506, can begin at 9, 3, 6, and 12 o'clock and can be 1 hour counterclockwise in length. The second set of stitch welds as depicted at block 508 can start where the first set of stitch welds finished at 8, 2, 5, and 11 o'clock. The third and final set of stitch welds, as depicted at block 510, can begin at the finish of the second stitch weld at 7, 1, 4, and 10 o'clock. Once the third set of stitch welds are complete, the part or component is completely welded around the entire perimeter (e.g., the perimeter of sensor package 400 depicted in FIG. 4). The third and final step to the weld process is the final weld, which is generally indicated at block 512. This weld can be completed with a higher power laser that starts at 12 o'clock and completely circles the part to finish at 12 o'clock while the part is generally located at about 65 degrees form the laser beam.

Based on the foregoing, it can be appreciate that embodiments of the present invention generally describe a weld fixture apparatus and a technique for welding a sensor cover to a sensor base so that any pre-determined load on the SAW quartz is not affected. First, a fixture apparatus is presented in which the sensor cover and sensor base are located parallel to each other and at a specific load. Second, a welding process is described which includes spot welds, stitch welds and a final weld at various power and weld size settings so that it is not necessary apply additional loads or un-load the quartz inside the package.

The weld fixture apparatus generally includes a base, load bar, load foot and guideposts. The fixture load bar can be spring-loaded and at a specific weight with an adjustable load foot that applies the pre-determined load to the base and also hold the base and cover parallel to each other. The pre-load on to the SAW quartz can be held as the welding process takes place.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A weld fixture apparatus, comprising:
a fixture base upon which a sensor package having a sensor base and a sensor cover is located a load bar associated with a spring, wherein said load bar receives said spring and is perpendicular to said spring and provides a specific weight to said fixture base in order to assist in maintaining said sensor cover and said sensor base parallel to one another upon said fixture base; and
an adjustable load foot located above said fixture base, wherein said adjustable load foot applies a pre-determined load with a specific weight to said sensor base in order to maintain said sensor cover and said sensor base securely in place as said sensor base and said sensor cover are welded to one another in order to configure said sensor package.

2. The apparatus of claim 1 further comprising a plurality of guideposts integrated with said load bar in order to assist in maintaining said sensor cover and said sensor base parallel to one another upon fixture base.

3. The apparatus of claim 1 further comprising a welding mechanism for tack welding said sensor cover to said sensor base in order to seal said sensor package.

4. The apparatus of claim 3 wherein said tack welding is provided by said welding mechanism at a low laser power for sealing said sensor package.

5. The apparatus of claim 4 wherein said sensor cover and said sensor base are located perpendicular to a laser beam generated by said welding mechanism for sealing sensor package.

6. The apparatus of claim 1 further comprising a welding mechanism for stitch welding said sensor cover to said sensor base via a plurality of stitch welds for sealing said sensor package.

7. The apparatus of claim 1 further comprising a welding mechanism for welding said sensor cover to said sensor base, wherein said welding mechanism comprises a high power laser.

8. A weld fixture apparatus, comprising:
a fixture base upon which a SAW sensor package having a sensor base and a sensor cover is located a load bar associated with a spring, wherein said load bar is located perpendicular to and receives said spring, thereby providing a specific weight to said fixture base in order to assist in maintaining said sensor cover and said sensor base parallel to one another upon said fixture base; and
a plurality of guideposts Integrated with said load bar in order to assist in maintaining said sensor cover and said sensor base parallel to one another upon fixture base;
an adjustable load foot located above said fixture base, wherein said adjustable load foot applies a pre-determined load with a specific weight to said sensor base in order to maintain said sensor cover and said sensor base securely in place as said sensor base and said sensor cover are welded to one another in order to configure said SAW sensor package.

9. A weld fixture method, comprising the steps of:
providing a fixture base upon which a sensor package having a sensor base and a sensor cover is located;
associating a load bar with a spring, wherein said load bar provides a specific weight to said fixture base in order to assist in maintaining said sensor cover and said sensor base parallel to one another upon said fixture base, wherein said sensor package comprises a SAW sensor; and
locating an adjustable load foot above said fixture base, wherein said adjustable load foot applies a pre-determined load with a specific weight to said sensor base in order to maintain said sensor cover and said sensor base securely in place as said sensor base and said sensor cover are welded to one another in order to configure said sensor package;
tack welding said sensor cover to said sensor base in order to seal said sensor package utilizing low laser power, wherein said sensor cover and said sensor base are located perpendicular to a laser beam generated by said low power laser;
thereafter stitch welding said sensor cover to said sensor base; and
thereafter welding said sensor cover to said sensor base utilizing a high power laser.

10. The method of claim 9 further comprising the step of Integrating a plurality of guideposts with said load bar in order to assist in maintaining said sensor cover and said sensor base parallel to one another upon fixture base.

11. A weld fixture method, comprising the steps of:
providing a fixture base upon which a sensor package having a sensor base and a sensor cover is located;
associating a load bar with a spring, wherein said load bar receives said spring and is perpendicular to said spring and provides a specific weight to said fixture base in order to assist In maintaining said sensor cover and said sensor base parallel to one another upon said fixture base; and
locating an adjustable load foot above said fixture base, wherein said adjustable load foot applies a pre-determined load with a specific weight to said sensor base in order to maintain said sensor cover and said sensor base securely in place as said sensor base and said sensor cover are welded to one another In order to configure said sensor package.

12. The method of claim 11 further comprising the step of tack welding said sensor cover to said sensor base in order to seal said sensor package, wherein said tack welding is provided by utilizing low laser power, wherein said sensor cover and said sensor base are located perpendicular to a laser beam generated by said low power laser.

13. The method of claim 11 further comprising the steps of:
stitch welding said sensor cover to said sensor base; and
thereafter welding said sensor cover to said sensor base utilizing a high power laser.

14. The method of claim 11 wherein said sensor package comprises a SAW sensor.

15. The method of claim 11 further comprising the step of integrating a plurality of guideposts with said load bar in order to assist in maintaining said sensor cover and said sensor base parallel to one another upon fixture base.

16. The method of claim 15 wherein said plurality of guideposts functions as locator pins.

* * * * *